United States Patent
Tanigawa et al.

(10) Patent No.: US 9,810,260 B2
(45) Date of Patent: Nov. 7, 2017

(54) BEARING DEVICE FOR BEAUTY ROLLER/HEALTH ROLLER, AND BEAUTY ROLLER/HEALTH ROLLER

(75) Inventors: Naonari Tanigawa, Mie (JP); Tsuyoshi Matsushita, Aichi (JP)

(73) Assignees: NTN CORPORATION, Osaka (JP); MTG CO., LTD, Aichi (JP)

( * ) Notice: Subject to any disclaimer, the term of this patent is extended or adjusted under 35 U.S.C. 154(b) by 1184 days.

(21) Appl. No.: 13/879,358

(22) PCT Filed: Sep. 30, 2011

(86) PCT No.: PCT/JP2011/072582
§ 371 (c)(1),
(2), (4) Date: Jun. 4, 2013

(87) PCT Pub. No.: WO2012/049982
PCT Pub. Date: Apr. 19, 2012

(65) Prior Publication Data
US 2013/0245509 A1 Sep. 19, 2013

(30) Foreign Application Priority Data

Oct. 14, 2010 (JP) .................................. 2010-231437

(51) Int. Cl.
*A61H 15/00* (2006.01)
*F16C 17/10* (2006.01)
(Continued)

(52) U.S. Cl.
CPC ......... *F16C 17/10* (2013.01); *A61H 15/0092* (2013.01); *F16C 27/08* (2013.01);
(Continued)

(58) Field of Classification Search
CPC ............ A61H 15/00; A61H 2015/0007; A61H 2015/0014; A61H 2015/0021;
(Continued)

(56) References Cited

U.S. PATENT DOCUMENTS

| 4,220,380 A * | 9/1980 | Crase ...................... E21B 4/003 175/107 |
| 4,465,446 A * | 8/1984 | Nemit, Jr. ............... F01C 21/02 384/588 |

(Continued)

FOREIGN PATENT DOCUMENTS

| CN | 101472642 A | 7/2009 |
| CN | 201586180 U | 9/2010 |

(Continued)

OTHER PUBLICATIONS

English Abstract of JP 2006-002907A dated Jan. 5, 2006.
English machine translation of claims of JP 3117485U dated Jan. 5, 2006.

*Primary Examiner* — LaToya M Louis
(74) *Attorney, Agent, or Firm* — Hedman & Costigan, P.C.; James V. Costigan; Kathleen A. Costigan (57) ABSTRACT

A bearing device for a beauty and health roller which presents no risk of bathwater or bathtub contamination, is hygienic, is less heavy than conventional ball bearings, is devoid of roller rattle, and exhibits a small rotational resistance of the rollers. The bearing device for a beauty and health roller is used in a beauty and health roller having a grippable body and a roller arranged at the end portion of the body, and rotatably supports the roller on a supporting shaft provided to the end portion of the body. The bearing device comprises a radial bearing 5 into which the supporting shaft is fitted and which rotatably supports the roller on the supporting shaft 2a.

18 Claims, 5 Drawing Sheets

(51) Int. Cl.
*F16C 33/20* (2006.01)
*F16C 27/08* (2006.01)

(52) U.S. Cl.
CPC ...... *F16C 33/20* (2013.01); *A61H 2015/0014* (2013.01); *A61H 2201/0115* (2013.01); *A61H 2201/1454* (2013.01); *A61H 2201/1695* (2013.01); *F16C 2202/50* (2013.01); *F16C 2208/52* (2013.01); *F16C 2208/60* (2013.01); *F16C 2208/66* (2013.01); *F16C 2208/78* (2013.01); *F16C 2220/04* (2013.01); *F16C 2220/08* (2013.01); *F16C 2316/00* (2013.01)

(58) Field of Classification Search
CPC .... A61H 2015/0028; A61H 2015/0042; A61H 2015/005; A61H 2015/0085; A61H 2015/0092; F16C 17/10; F16C 17/12
See application file for complete search history.

(56) References Cited

U.S. PATENT DOCUMENTS

| | | | | |
|---|---|---|---|---|
| 4,585,215 A | * | 4/1986 | Kramer | B29C 63/42 267/124 |
| 5,421,657 A | * | 6/1995 | Arff | F16C 25/08 384/620 |
| 5,667,314 A | * | 9/1997 | Limanowka | F16C 19/30 384/613 |
| 5,711,758 A | * | 1/1998 | Tseng | A61H 15/0085 601/112 |
| 8,623,801 B2 | * | 1/2014 | Oki | C08J 5/18 508/591 |
| 8,864,231 B2 | * | 10/2014 | Shimoda | B60N 2/0232 297/311 |
| 2007/0116390 A1 | * | 5/2007 | Hokkirigawa | F16C 17/10 384/271 |
| 2010/0137755 A1 | * | 6/2010 | Nagano | A61H 15/00 601/15 |
| 2010/0145240 A1 | * | 6/2010 | Cromie | A61H 15/00 601/99 |
| 2011/0009782 A1 | * | 1/2011 | Pampalone | A61H 15/0092 601/119 |
| 2011/0182542 A1 | * | 7/2011 | Brown | F16C 19/30 384/620 |

FOREIGN PATENT DOCUMENTS

| | | | | |
|---|---|---|---|---|
| CN | 201701444 U | | 1/2011 | |
| DE | 20301620 U1 | | 4/2003 | |
| JP | 2510584 Y | | 1/1992 | |
| JP | 11-192275 A | | 7/1999 | |
| JP | 2003-038596 A | | 2/2003 | |
| JP | 2004-49275 A | | 2/2004 | |
| JP | 2005-245826 A | | 9/2005 | |
| JP | 2006-002907 A | | 1/2006 | |
| JP | 3117485 U | | 1/2006 | |
| JP | 2008-264507 A | | 11/2008 | |
| JP | 3159255 U | | 4/2010 | |
| JP | WO 2010038718 A1 | * | 4/2010 | ................ C08J 5/18 |
| KR | 10-0902551 B1 | | 6/2009 | |

* cited by examiner

BEARING DEVICE FOR BEAUTY ROLLER/HEALTH ROLLER, AND BEAUTY ROLLER/HEALTH ROLLER

TECHNICAL FIELD

The present invention relates to a bearing device for rotatably supporting rollers of a manual beauty/health roller, and a beauty/health roller that is equipped with this bearing device. A "beauty/health roller" is a roller used for beautification and/or therapeutic purposes.

BACKGROUND ART

A variety of beauty/health rollers used for beautifying the skin or maintaining attractive skin on the face, hands, feet, and the like are sold commercially. An operation for obtaining a target effect using such beauty/health rollers is performed by gripping a handle, which is the body thereof, pressing a roller arranged at the distal end of the handle against the bare skin, and causing the roller to rotate on the bare skin. The beauty/health roller is pressed against the bare skin and caused to rotate to yield a massaging effect. There is known in the art a beauty/health roller wherein a metal, mineral, or the like considered to have a cosmetic effect is kneaded into and cemented to the roller.

In order for the roller of a conventional beauty/health roller to rotate smoothly, a structure for rotatably supporting the roller using ball bearings has been employed (for example, see Patent Document 1), particularly in high-end models. In particular, ball bearings made of stainless steel are used in beauty/health rollers capable of being used during bathing, in order to realize a superior beautifying effect. When ball bearings are used, a waterproof seal (waterproof structure) such as an O-ring is provided for making the interior of the roller waterproof so that bathwater does not come into contact with the ball bearing.

A cosmetic roller having a ring-shaped O-ring provided on the outer periphery of a shaft has been proposed as a roller in which excessively smooth rotation is prevented by applying a brake to the roller (see Patent Document 2), and a cosmetic roller in which plastic is used for a handle member and bearing member in order to produce a more attractive outward appearance (see Patent Document 3).

PRIOR ART DOCUMENTS

Patent Documents

Patent Document 1: Japanese Registered Utility Model No. 2510584
Patent Document 2: Japanese Laid-Open Patent Publication No. 2005-245826
Patent Document 3: Japanese Laid-Open Patent Publication No. 2003-038596

SUMMARY OF THE INVENTION

Problems to be Solved by the Invention

However, because conventional ball bearings are made of metal, a problem is presented in that women, who constitute the majority of users, find the beauty/health roller heavy. In addition, the beauty/health roller may be used while immersed in hot water in a bathtub during bathing, which raises a concern that an oil component, grease component, rust, and the like will leak out; spread over the surface of the hot water; and contaminate the bathtub.

With a beauty/health roller in which a waterproof seal, such as an O-ring, is provided, the waterproof seal becomes resistant to the rotation of the roller, and resistance is encountered in the rotational operation of the roller. In addition, when a ring-shaped O-ring is provided to the outer periphery of the bearing, as described in Patent Document 2, adjustment of the rotational resistance of the roller becomes difficult, and as in the case of the waterproof seal, there is a problem because resistance is encountered in the rotational operation of the roller. In addition, with this structure, rattling of the roller in the axial direction or other direction cannot be prevented.

Thus, when the beauty/health roller feels heavy, resistance is encountered in the rotational operation of the roller, or the roller rattles, the user experience of the beauty/health roller will not be high.

The present invention was devised in response to these problems, it being an object thereof to provide a bearing device for a beauty/health roller that is hygienic owing to the absence of risk of bathwater or bathtub contamination, of less weight than conventional ball bearings, devoid of roller rattle, and exhibits minimal rotational resistance in the roller, and to provide a beauty/health roller having this bearing device.

Means for Solving the Problem

The bearing device for a beauty/health roller of the present invention is a bearing device for a beauty/health roller having a grippable main unit and a roller arranged at the end portion of the main unit, the bearing device rotatably supporting the roller on a support shaft provided to an end portion of the main unit, wherein the bearing device is characterized in comprising: a radial bearing into which the support shaft is fitted, the radial bearing rotatably supporting the roller on the support shaft; a thrust bearing arranged toward one end face of the radial bearing; a preload-applying member interposed between the radial bearing and the thrust bearing; and the radial bearing and the thrust bearing each being a slider bearing molded from a resin composition. In particular, the bearing device is characterized in that the radial bearing has electrical conductivity.

The invention is characterized in that the preload-applying member is an elastic ring comprising a rubber or an elastomer. The invention is also characterized in that the rubber or elastomer is at least one material selected from among silicone rubber, ethylene-propylene rubber, acrylonitrile-butadiene rubber, and fluororubber.

The invention is characterized in that the elastic ring is configured so as to be capable of elastically deforming into an outwardly flared shape. The invention is also characterized in that the elastic ring comprises a cylindrical portion fitted to a sleeve portion of the radial bearing, and a flared portion in contact with the thrust bearing. The invention is further characterized in that the boundary portion between the cylindrical portion and the flared portion is thinner than the cylindrical portion.

The invention is characterized in that the resin composition used in the molding of at least one of the radial bearing and the thrust bearing is a composition that includes a lubricity improver. The invention is also characterized in that the lubricity improver is at least one material selected from among carbon, solid lubricants, waxes, and lubricating oils.

The invention is characterized in that the radial bearing is an article obtained by injection-molding the resin composition for molding the radial bearing.

The invention is characterized in that the base resin of the resin composition is at least one synthetic resin selected from among polyacetal resins, polyphenylene sulfide resins, polyamide resins, polyphenylene oxide resins, and polyethylene resins.

The invention is characterized in that a gap formed in the axial direction is provided on at least one surface selected from among an inner peripheral surface of the roller and an outer peripheral surface of the radial bearing.

The invention is characterized in that the radial bearing slides on the support shaft and rotates in synchronization with the roller.

The invention is characterized in that an axially oriented, rib-shaped projection is formed on the inner peripheral surface of the roller, a fitting groove into which the rib-shaped projection is fitted is formed on the outer peripheral surface of the radial bearing, and the radial bearing is rotated in synchronization with the roller by the fitting of the rib-shaped projection and the fitting groove.

The bearing device is also characterized in that a member separate from the roller is provided on the outer peripheral surface of the roller, a leg portion of the separate member projects from the inner peripheral surface of the roller through a hole portion formed in the surface of the roller, a fitting groove into which the projecting portion of the leg portion of the separate member is fitted is formed in the outer peripheral surface of the radial bearing, and the radial bearing is rotated in synchronization with the roller by the fitting of the projection portion and the fitting groove.

A beauty/health roller of the present invention has a grippable main unit, a roller arranged at an end portion of the main unit, and a bearing device for rotatably supporting the roller on a support shaft provided at the end portion of the main unit, wherein the beauty/health roller is characterized in that the bearing device is the bearing device of the present invention.

The invention is characterized in that a surface of the roller is metal plated, and the support shaft and the roller are electrically energized via the bearing device.

The invention is characterized in that a plurality of the bearing devices are provided in the interior of the roller in the axial direction. The invention is also characterized in that the interior of the roller does not have a waterproof structure.

Effect of the Invention

The bearing device for a beauty/health roller of the present invention is a bearing device for a beauty/health roller having a grippable body and a roller arranged at the end portion of this body, the bearing device rotatably supporting the roller on the support shaft provided at the end portion of the body. This bearing device comprises a radial bearing into which the support shaft is fitted and which rotatably supports the roller on the support shaft, a thrust bearing arranged toward one end face of this radial bearing, and a preload-applying member interposed between the radial bearing and the thrust bearing; and each of the radial bearing and thrust bearing is a slider bearing molded from resin compositions; therefore, the bearing device affords the following advantages:

1) A bearing device that is substantially more compact and lighter in weight than a conventional ball bearing can be realized.

2) The rotational resistance of the rollers can be reduced and the feel for use of the device is improved.

3) Roller rattle can be eliminated.

4) Use in hot water is not accompanied by leakage of rust or an oil component, nor does contamination of the bathwater, the bathtub, or the like occur.

5) Since it is possible to use a structure in which a waterproof seal, such as an O-ring, is not provided, feel for use is improved.

Because the radial bearing has electrical conductivity, it is ideal for a beauty/health roller having a microcurrent generator.

Because the preload-applying member is an elastic ring comprising a rubber or an elastomer, a structure in which the preload can be adjusted without using a complicated structure can be obtained. In addition, because the rubber or elastomer is selected from at least silicone rubbers, ethylene propylene rubbers, acrylonitrile-butadiene rubbers, and fluororubbers, it is hygienic.

Because the elastic ring has a shape elastically-deformable into an outwardly flared shape, the adjustment width for preloading can be increased. In addition, because the elastic ring comprises a cylinder portion fitted to a sleeve portion of the radial bearing and a flared portion in contact with the thrust bearing, the preload-applying member can be attached and fixed to the radial bearing and setting of the bearing device to the support shaft is facilitated. In addition, because the boundary portion between the cylinder portion and flared portion is thinner than the cylinder portion, the flared portion can be elastically deformed into a cone shape with ease and the adjustment width for preloading can be increased.

Because the resin composition used to mold the radial bearing and/or the thrust bearing is a composition including a lubricity improver, the rotational resistance (rotational torque) of the roller can be made smaller than a case in which this lubricity improver is not included, and the feel for use is improved over that of a conventional ball bearing. In addition, because the lubricity improver is at least one selected from carbon, a solid lubricant, wax, and a lubricating oil, the rotational resistance can be further reduced and the feel for use improved even more.

Because the radial bearing is an injection molded article made of the resin composition used to mold this radial bearing, manufacture of the radial bearing is facilitated even when a complicated shape is desired.

Because the base resin of the resin composition for molding a radial bearing and a thrust bearing is at least one synthetic resin selected from a polyacetal resin, polyphenylene sulfide resin, polyamide resin, polyphenylene oxide resin, and polyethylene resin, the resins has outstanding lubricity, poses no concern of contaminating bathwater when the beauty/health roller is used during bathing, and keeps the rotational resistance of the roller low.

Because a gap formed in the axial direction is provided on a surface selected from at least the inner peripheral surface of the roller and the outer peripheral surface of the radial bearing, water is prevented from pooling inside the roller even when water gets inside the roller.

Because the radial bearing slides in contact with the support shaft and rotates synchronously with the roller, rotation of the roller follows the operation of the handle, and an exceptional operation feel is achieved.

In addition, a synchronous rotation of the radial bearing and roller is enabled without the use of an adhesive or the like because the bearing device has a structure in which an axially oriented, rib-shaped projection is formed on the inner peripheral surface of the roller, a fitting groove into which the rib-shaped projection is fitted is formed on the outer peripheral surface of the radial bearing, and the radial bearing rotates synchronously with the roller by the fitting of the rib-shaped projection to the fitting groove.

In addition, because the bearing device has a structure wherein a separate member from the roller is provided on the outer peripheral surface of the roller, a leg portion of the separate member projects from the inner peripheral surface of the roller through a hole portion formed at the surface of the roller; a fitting groove into which the projecting portion of the leg portion of the separate member is fitted is formed on the outer peripheral surface of the radial bearing; and the radial bearing rotates synchronously with the roller by the fitting of the projection portion to the fitting groove, this separate member can be fixed to the outer peripheral surface of the roller and the roller can be fixed to the radial bearing, so a synchronous rotation between the radial bearing and the roller is enabled without the use of an adhesive or the like.

Because the beauty/health roller of the present invention is a beauty/health roller which has a grippable body, a roller provided at an end portion of the body, and a bearing device for rotatably supporting the roller on a support shaft provided at the end portion of the body, and the bearing device of the present invention described above is used as the bearing device, the beauty/health roller and the rotational operation of the roller do not feel heavy to female users. In addition, use of the bearing device during bathing is enabled, and the bearing device is hygienic because any concern regarding bathwater contamination is non-existent.

Because the surface of the roller is metal plated, and the support shaft and the roller are in electrical contact via the bearing device, a microcurrent generator will effectively function.

Because a plurality of bearing devices are provided in the axial direction inside the roller, the stability of the roller is excellent. In addition, because the roller does not have a waterproof structure in the interior thereof, a further reduction in weight is realized.

MODE FOR CARRYING OUT THE INVENTION

Figure 1:
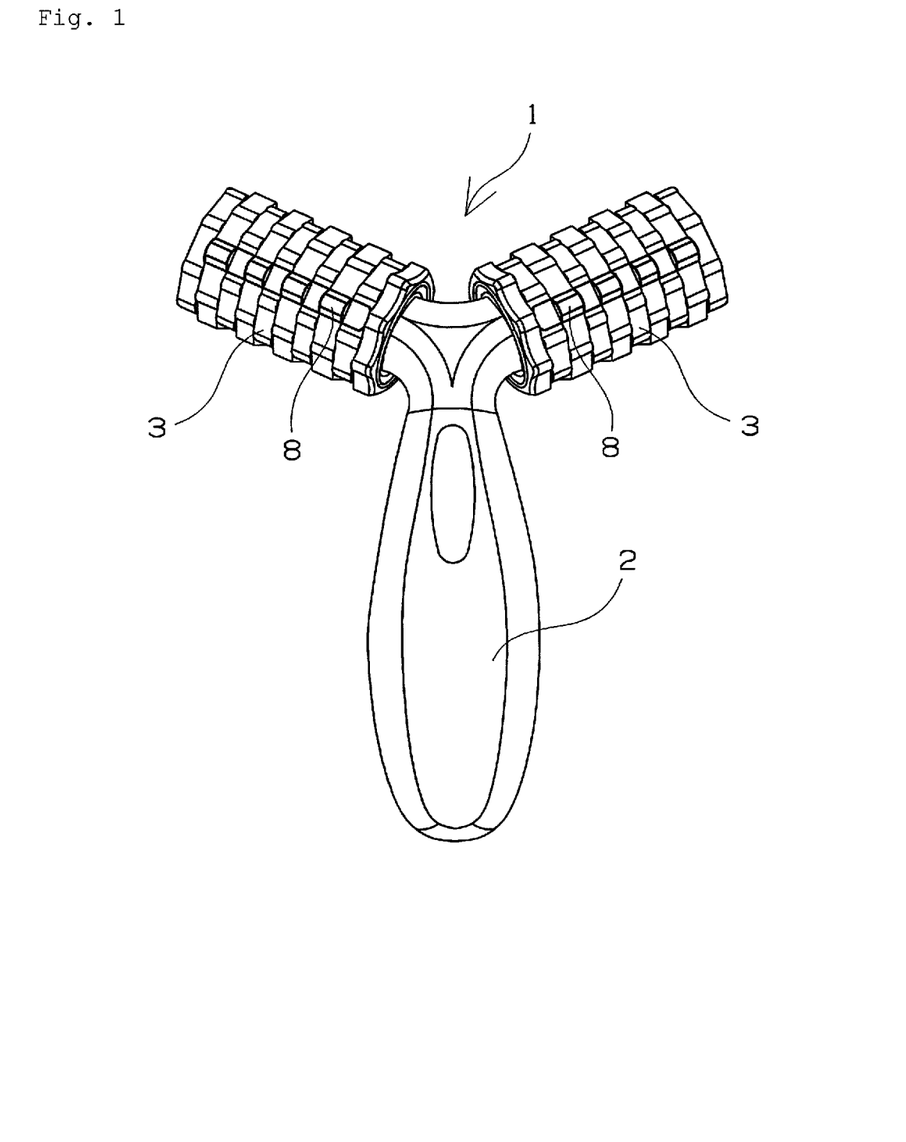
FIG. 1 is front view showing an example of the beauty/health roller of the present invention.
Figure 2:
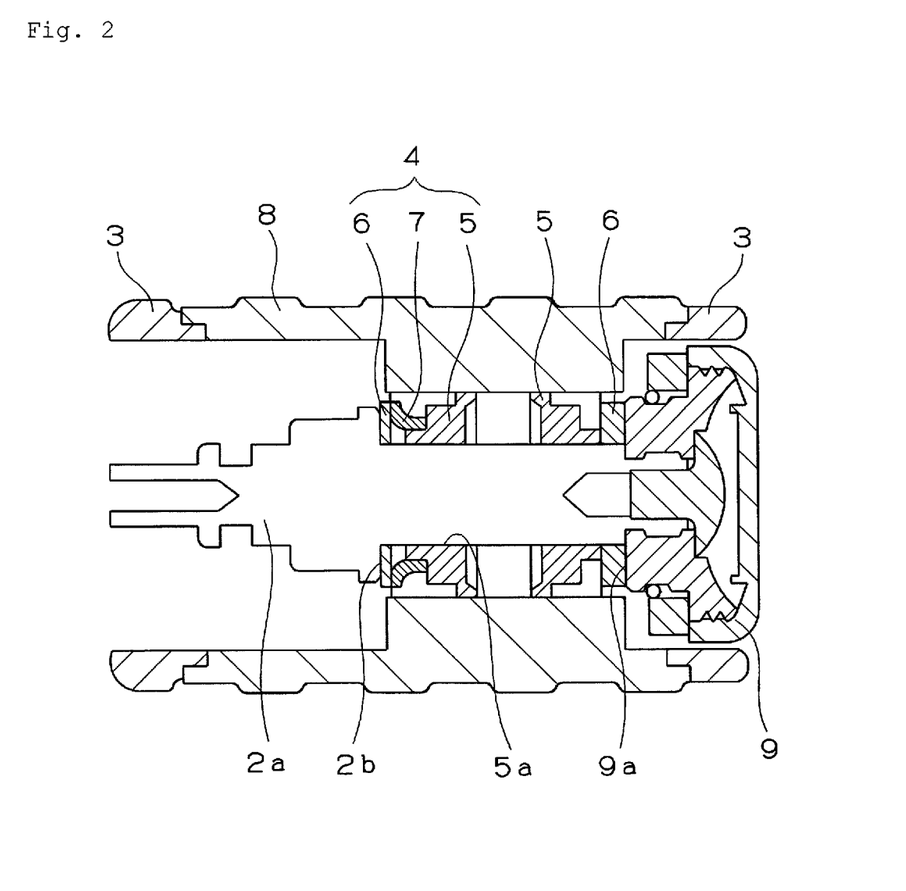
FIG. 2 is a cross-sectional view of the roller part in the axial direction of the roller.
Figure 3:
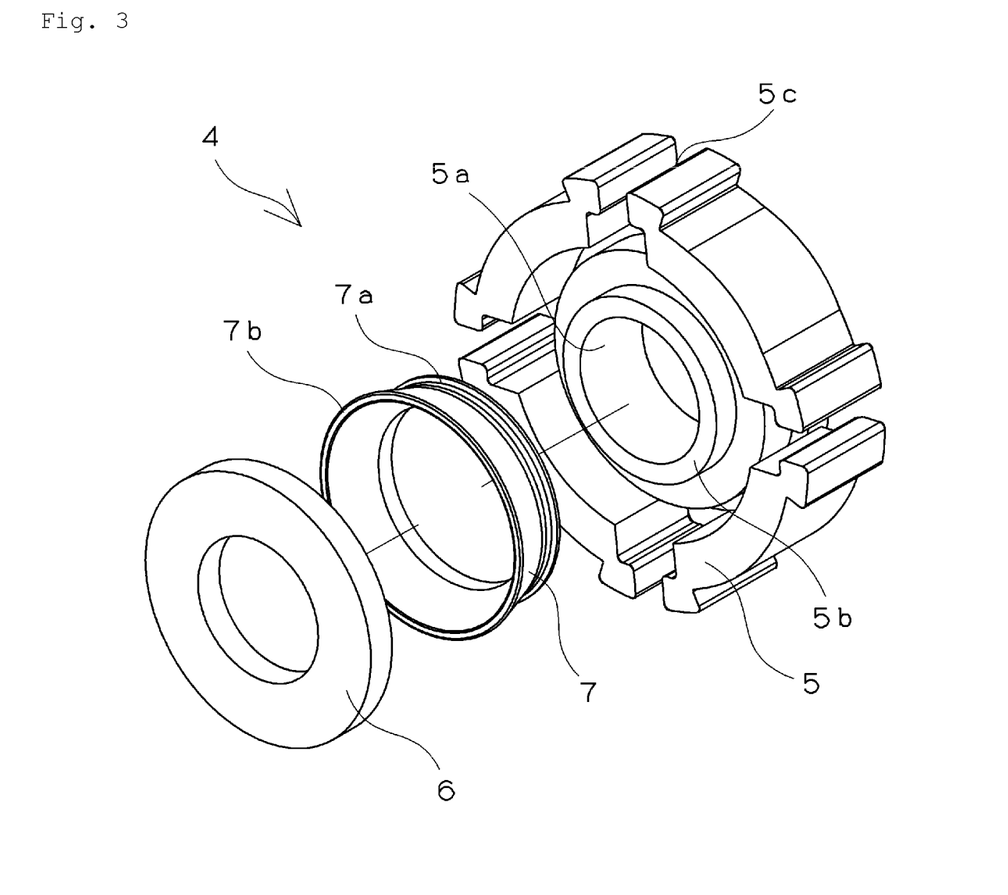
FIG. 3 is an exploded perspective view of the bearing device.

An example of the beauty/health roller of the present invention is described on the basis of FIGS. 1 to 3. FIG. 1 is a front view showing an example of the beauty/health roller of the present invention. FIG. 2 is a cross-sectional view of a roller 3 part in the axial direction of the roller and FIG. 3 is an exploded perspective view of a bearing device 4. As shown in FIG. 1, a beauty/health roller 1 is composed of a body 2 (handle) that a person can grip with one hand, and two rollers 3 that are arranged to the end portions of the body 2. The two rollers 3 are arranged at the end portion of the body 2 to be gripped are arranged so as to form a V shape suited to the curves of the face and body lines. A separate member 8, which is to be described later, is provided on the outer peripheral surfaces of the rollers 3. In addition, as shown in FIG. 2, these rollers 3 are rotatably supported by the bearing device 4 of the present invention, on a support shaft 2a provided to the end portion of the body 2. As shown in FIGS. 2 and 3, the bearing device 4 is composed of a radial bearing 5, a thrust bearing 6 arranged toward one end face of the radial bearing 5, and a preload-applying member 7 interposed between the radial bearing 5 and the thrust bearing 6. A cover body 9 is provided to a support shaft 2a close to the end portion of the roller 3. The support shaft 2a is fixed and the cover body 9 is pushed in to the left in the drawing by threads or the like, whereby the bearing device 4 and rollers 3 (including the separate members 8) move integrally to the left in the drawing. The preload-applying member 7 is, accordingly, interposed between the radial bearing 5 and thrust bearing 6 and elastically deformed.

The radial bearing 5 is a slider bearing into which the support shaft 2a at the end portion of the body is fitted and the rollers 3 are rotatably supported to the support shaft 2a. In addition, the thrust bearing 6 is a ring-shaped slider bearing into which the support shaft 2a is fitted. Because the bearing device 4 has a structure in which the radial bearing 5, preload-applying member 7, and thrust bearing 6 are arranged in series on the support shaft 2a in that order, it is compact and a reduction in weight is realized.

The radial bearing 5 and thrust bearing 6 are slider bearings molded using the same or different resin compositions. A synthetic resin serving as the base resin of the resin composition used to mold the radial bearing 5 and thrust bearing 6 is not limited in particular provided that the resin is a synthetic resin able to be used as a material for a slider bearing. A polyacetal (POM) resin, polyphenylene sulfide (PPS) resin, polyamide (PA) resin, polyphenylene oxide (PPO) resin, polyethylene (PE) resin, polycarbonate (PC) resin, polyethylene terephthalate (PET) resin, polyether ether ketone (PEEK) resin, thermoplastic polyimide (PI) resin, polyamide-imide (PAI) resin, polytetrafluoroethylene (PTFE) resin, polytetrafluoroethylene-perfluoroalkyl vinyl ether copolymer (PFA) resin, tetrafluoroethylene-hexafluoropropylene copolymer (FEP) resin, ethylene-tetrafluoroethylene copolymer (ETFE) resin, and the like are cited as examples of the synthetic resin.

In addition, low-density PE resins, high-density PE resins, ultra-high-molecular-weight PE resins, and the like are cited as PE resins. In addition, an aliphatic polyamide resin, such as a polyamide 6 (PA6) resin, polyamide 6-6 (PA66) resin, polyamide 6-10 (PA610) resin, polyamide 6-12 (PA612) resin, or polyamide 4-6 (PA46) resin, is cited as a PA resin; and an aromatic (aliphatic aromatic) polyamide resin which has an aromatic ring in the polymer straight chain, such as a polyamide 9-T (PA9T) resin, polyamide 6-T (PA6T) resin, and poly-m-xylene adipamide (polyamide MXD-6) resin. The numeral in each PA resin represents the number of carbons between amide bonds and T represents a terephthalic acid residue.

These resins may be used individually or as a polymer alloy in which two or more of them have been compounded. The molding method may be suitably selected from compression molding, extrusion molding, injection molding, and other molding methods depending on the type of the material. Out of these synthetic resins, it is preferable to use at least one selected from a POM resin, PPS resin, PA resin, PPO resin, and PE resin that has exceptional lubricity, that presents no risk of bathwater contamination when used during bathing, and that has consistently low rotational torque.

In addition, the resin composition used to mold the radial bearing 5 and/or thrust bearing 6 is preferably a composition containing a lubricity improver. By compounding the lubricity improver in the composition, the rotational torque of the rollers 3 can be reduced and the feel for use can be improved over that of a conventional ball bearing. Carbon, solid lubricants, waxes, and lubricating oils are in particular cited for the lubricity improver for reducing the rotational torque of the rollers 3. These lubricity improvers may be compounded singly or as a combination of two or more of them.

A PTFE resin powder, graphite powder, molybdenum disulfide, thermosetting resin powder, and other powders are cited as examples of solid lubricants. A powder of a PTFE resin heated and sintered at or above its melting point or irradiated by γ-rays, electron beams, or other irradiation may also be used for the PTFE resin powder.

Out of the lubricity improvers, it is preferable, in particular, to use carbon and a solid lubricant in a state in which the rollers are immersed in bathwater in a bathtub during use while bathing because the lubricating effect (feel for use of the rollers) does not vary.

It is preferable to compound an agent giving electrical conductivity, such as a conductive carbon, with the resin composition used to mold the radial bearing 5. By giving electrical conductivity to the radial bearing 5, a microcurrent, which is to be described later, can be handled. Carbon fibers, carbon nanotubes, fullerenes, carbon powder, and so forth are cited as examples of electroconductive carbons. In particular, Ketjen black, which is a carbon powder, is preferable because it has of outstanding electroconductivity.

The volume resistivity of the radial bearing 5 is preferably less than $1.0\times10^5$ Ωcm. By setting this value in this range, to the extent that the effect by the microcurrent can be realized, the support shaft 2a and rollers 3 can be electrically energized via the radial bearing 5. In the resin composition used to mold the radial bearing 5, the compounded amount of the agent giving electroconductivity is preferably set to an amount less than the range of the volume resistivity.

The radial bearing 5 is of a complex shape allowing fitting to the preload-applying member 7 and roller 3, and thus is preferably obtained as an injection molded article using a resin composition which employs an injection-moldable synthetic resin as the base resin. By using an injection molded article, the radial bearing 5 can be easily manufactured even when a complicated shape such as in FIGS. 2, 3, and the like is intended. In addition, the thrust bearing 6 can have a simple ring shape, as shown in FIG. 3, and can also be molded by compression molding or the like. As a preferred mode of the present invention, for example the radial bearing 5 can be manufactured by injection molding the electroconductive resin composition wherein a POM resin is used as the base, while the thrust bearing 6 can be manufactured by subjecting an ultrahigh molecular weight PE resin to compression molding or ram extrusion.

The preload-applying member 7 is interposed between the radial bearing 5 and thrust bearing 6. A preload is applied axially to the radial bearing 5 and thrust bearing 6. By applying the preload, rattling of the rollers 3 in the axial direction can be prevented. In addition, when the rotational resistance of the rollers 3 is too low, a risk is presented that the evenness of the rotation of the rollers 3 could be lost because the rollers might spin at times other than when the rollers 3 are rotated by being pressed against the skin. By applying the preload according to the present invention, a moderate rotational resistance can be applied to the rollers 3, and spinning or the like can be prevented. Preventing rattling and spinning makes evens the rotation of the rollers 3.

As long as the preload-applying member 7 can apply the preload, the structure and the like are not limited in particular. Because the preload can be adjusted without the use of a complicated structure, an elastically deformable ring (elastic ring) comprising a rubber or an elastomer is preferably adopted. The elastic ring, which is the preload-applying member, is interposed between the radial bearing and thrust bearing and elastically deformed, whereby the preload is applied by a restitutive force. In addition, because this elastic ring has a simple structure, failure is less likely to occur and cost can be reduced.

Vulcanized rubbers, such as silicone rubbers, ethylene-propylene rubbers (EPDM), acrylonitrile-butadiene rubbers (NBR), fluororubbers, isoprene rubbers, styrene rubbers, butadiene rubbers, nitrile rubbers, chloroprene rubbers, butyl rubbers, acryl rubbers, chlorosulfonated polyethylene rubbers, chlorinated polyethylene rubbers, and epichlorhydrin rubbers, are cited as examples of the rubber making up the elastic ring. In addition, thermoplastic elastomers, such as polyurethane elastomers, polyester elastomers, polyamide elastomers, polybutadiene-based elastomers, and soft nylon-based elastomers, are cited as examples of the elastomer making up the elastic ring. In particular, it is preferable for the rubber or elastomer to be at least one selected from silicone rubber, EPDM, NBR, and fluororubber.

Figure 4:
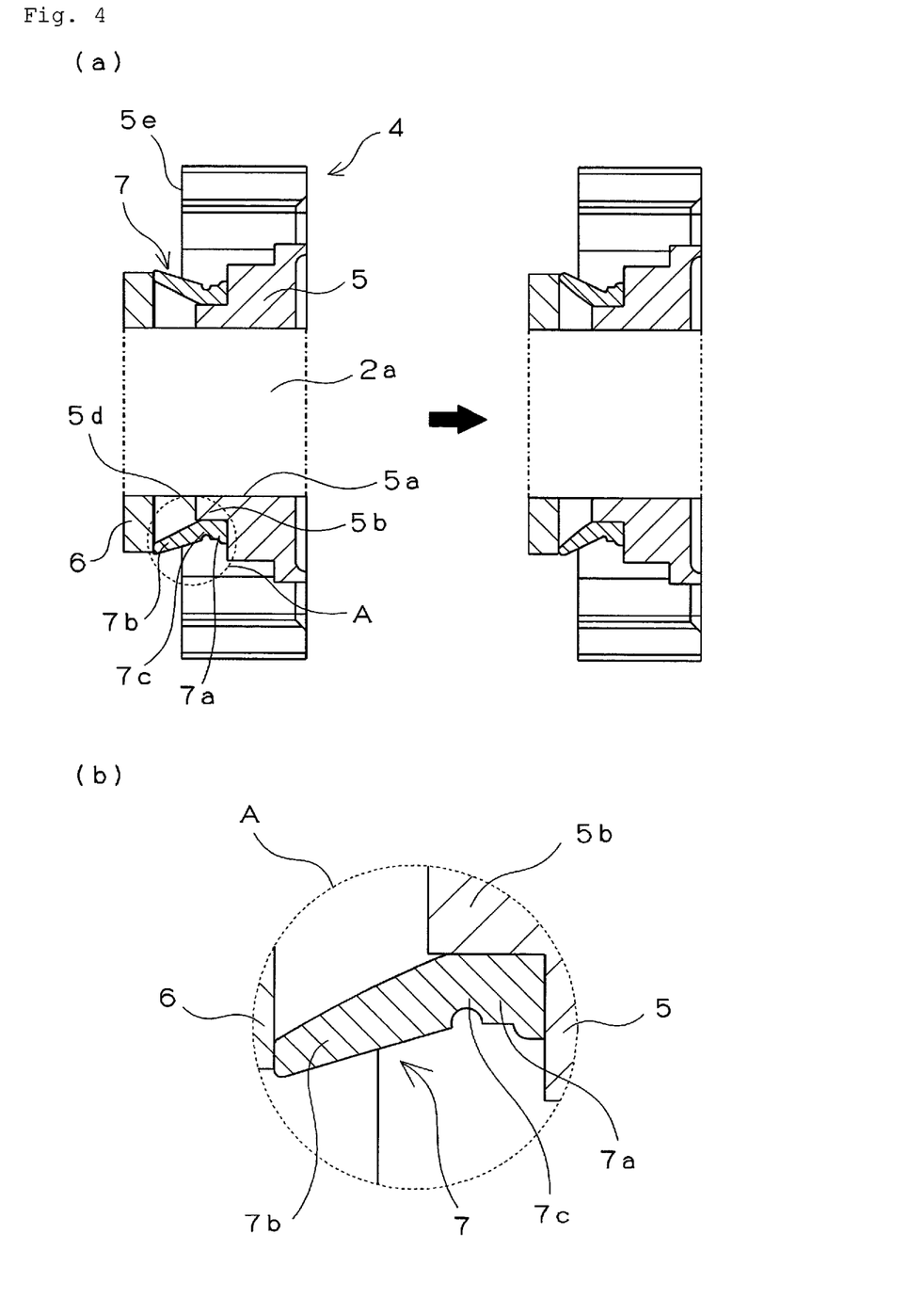
FIG. 4 is an axial cross-sectional view of the bearing device and a partial magnified drawing thereof.

The preload-applying member 7 will be described on the basis of FIG. 4. FIG. 4(*a*) is an axial cross-sectional view of the bearing device part and FIG. 4(*b*) is a partial (part A) enlarged drawing in FIG. 4(*a*). The preload-applying member 7 of the mode shown in FIG. 4 is an elastic ring composed of a cylinder portion 7a engaging with a sleeve portion 5b of the radial bearing 5 and an outwardly flared portion 7b in contact with the thrust bearing 6. The outwardly flared portion is a portion that flares outward, namely, a cylinder part whose diameter increases in a continuous or staggered manner in the axial direction. By employing this structure, the preload-applying member 7 can be attached and fixed to the radial bearing 5, and setting of the bearing device 4 to the support shaft 2a at the end portion of the body is facilitated. The sleeve portion 5b has a shape surrounding a shaft hole 5a of the radial bearing 5. An end face 5d of the sleeve portion 5b is positioned in the axial direction on the thrust bearing 6 side further inside the radial bearing 5 than an outer peripheral end face 5e. The preload-applying member 7 can be fixed securely by making the axial length of the sleeve portion 5b of the radial bearing 5 nearly the same as or longer than the axial length of the cylinder portion 7a of the preload-applying member 7.

The outwardly flared portion 7b of the preload-applying member 7 projects in the axial direction further outside the radial bearing 5 on the thrust bearing 6 side than the outer peripheral end face 5e. As the distance between the radial bearing 5 and thrust bearing 6 fitted into the support shaft 2a is compressed in the axial direction, the flare shape of the outwardly flared portion 7b of the preload-applying member 7 is elastically deformed in a direction it expands (see the right drawing of FIG. 4(*a*)). By obtaining the flare shape, as described above, the amount of deformation can be kept larger than that of a preload-applying member having a cylindrical shape that uses the same material. As a result, the adjustment width for preloading can be increased. The preload can be adjusted in accordance with the degree of inward pushing of the cover body 9 provided to each of the rollers 3 at the end portion of the support shaft 2a (see FIG. 2).

As shown in FIG. 4(*b*), a boundary portion 7c between the cylinder portion 7a and outwardly flared portion 7b in the preload-applying member 7 is preferably thicker than at least the cylinder portion 7a. By adopting such a configuration, the outwardly flared portion 7b is elastically deformed into the flare shape with ease by utilizing this boundary portion 7c as a varying portion, and the adjustment width for preloading can be increased. In FIG. 4(b), the boundary portion 7c is thinner than the portion of the outwardly flared portion 7b adjacent to the boundary portion 7c. Moreover, in FIG. 4(b), the outer periphery side of the preload-applying member 7 is made thinner, but no limitation is imposed thereby; the inner periphery side or other part may be made thinner.

In addition to the mode shown in FIG. 4, the preload-applying member 7 can be made, e.g., into a cylindrical shape having a certain wall thickness, notches being formed at equal intervals in the circumferential direction substantially halfway around in the axial direction of the cylinder, as a shape elastically deformable to a flare shape.

In the beauty/health roller 1 of the present invention, one or more bearing devices 4 can be provided (see FIG. 2). When a plurality of bearing devices 4 is used, they can be set apart from one another lined up in the axial direction on the support shaft, or they can be arranged without being set apart. In order to prevent rattling of the rollers 3 on the support shaft 2a and increase the stability of the rollers 3, it is preferable that a plurality of bearing devices 4 be provided in the axial direction. In an alternative mode, one bearing device 4 (including the preload-applying member 7) is provided, and, additionally, either only the radial bearing 5 of the bearing device 4 is used, or as needed, the radial bearing 5 and thrust bearing 6 are used in combination. According to the mode shown in FIG. 2, a first bearing device 4 (to the left in the drawing) is used and a second bearing device (to the right in the drawing) in which the radial bearing 5 and thrust bearing 6 are combined is used, while the thrust bearing 6 of the second bearing device (to the right in the drawing) is made thicker than the thrust bearing 6 of the first (to the left in the drawing) bearing device 4.

As shown in FIG. 2, the thrust bearings 6 are ring-shaped slider bearings into which the support shaft 2a is fitted, and the bearings being arranged at positions where they slide against an end portion 2b of the support shaft 2a and an end portion 9a of the cover body 9. Because the radial bearing 5 and thrust bearing 6 are slider bearings molded from the aforementioned resin, applying grease or the like on the respective sliding surfaces is obviated.

As shown in FIG. 2, the radial bearing 5 is a slider bearing into which the support shaft 2a is fitted at the end portion of the body and which rotatably supports the roller 3 to the support shaft 2a. The radial bearing 5 is in contact with the support shaft 2a through the shaft hole 5a formed on the inner periphery, and it is in contact with the roller 3 at an outer peripheral portion. The radial bearing 5 of this mode slides on the support shaft 2a through the shaft hole 5a, and is fixed to and rotates synchronously with the roller 3.

Figure 5:
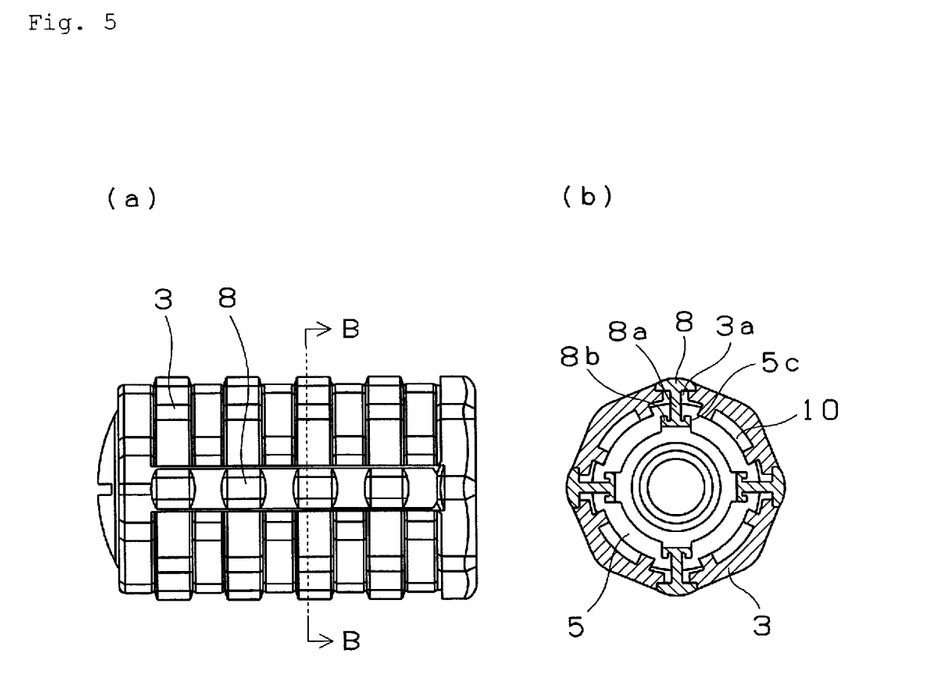
FIG. 5 is a drawing showing an example of the fixed structure of the roller and the radial bearing.

The fixed structure of the radial bearing 5 and roller 3 is described on the basis of FIG. 5. FIG. 5(a) is a front view of the roller 3 and FIG. 5(b) is a cross-sectional view along line B-B in FIG. 5(a). As shown in FIGS. 5(a) and (b), the separate member 8, which is a member separate from the roller 3, is provided on the outer peripheral surface of the roller 3. A leg portion 8a of the separate member 8 is projected from the inner peripheral surface of the roller 3 through an opening portion 3a formed in the surface of the roller 3. Meanwhile, a fitting groove 5c fitting with a projecting portion 8b of the leg portion 8a of the separate member 8 is formed on the outer peripheral surface of the radial bearing 5. Due to the fitting of the projecting portion 8b and fitting groove 5c to one another, the separate member 8 and radial bearing 5 are fixed. The roller 3 is constructed so as to be interposed between and fixed to the separate member 8 and radial bearing 5, the roller 3 rotating synchronously with the radial bearing 5.

According to this fixed structure, the separate members 8 can be fixed to the outer peripheral surface of the roller 3 and the roller 3 can be fixed to the radial bearing 5 without using an adhesive or the like. Because there is direct contact between the beauty/health roller and the skin, the use of an adhesive is undesirable. Moreover, the separate member may be a molded article of a metal, natural ore, ceramic or other material considered to have a cosmetic effect, a molded article of a powder of these materials, or a member obtained by molding this powder into a prescribed shape by a synthetic resin, such as polypropylene resin. Rose quartz, citrine, agate, hematite, aquamarine, amethyst, rutile quartz, jade, tourmaline, phyllite, Horai-stone, cherry-stone, Seiryu-stone, Guiyang-stone, Io-stone, germanium, and the like are cited as examples of this kind of metal and natural ore.

In addition, a structure in which an axially-oriented, rib-shaped projection is formed on the inner peripheral surface of the roller 3, and at the same time, the fitting groove 5c fitting with this rib-shaped projection is formed on the outer peripheral surface of the radial bearing 5 is cited as another fixed structure. This rib-shaped projection corresponds to the projecting portion 8b of the leg portion 8a of the separate member 8 in FIG. 5. By the fitting of this rib-shaped projection and the fitting groove 5c to each other, the roller 3 and the radial bearing 5 are fixed without the use of an adhesive or the like. The roller 3 accordingly forms a structure wherein it rotates synchronously with the radial bearing 5.

By providing the fixed structures, as described above, the mode of the radial bearing 5 is one in which the radial bearing 5 slides against the support shaft 2a through the shaft hole 5a, and is fixed to and rotates synchronously with the roller 3, whereby rotation of the roller 3 follows the operation of the handle and the feel of the operation is excellent. In addition, a mode in which the radial bearing 5 and support shaft 2a are fixed and rotated in synchronization and slide against the inner peripheral surface of the roller 3 at the outer peripheral surface of the this radial bearing 5 can also be obtained as another mode.

Because the radial bearing 5 is in contact with the support shaft 2a through the shaft hole 5a formed on the inner periphery and is in contact with the roller 3 at the outer peripheral portion, this radial bearing 5 is provided with electroconductivity, whereby the support shaft 2a and roller 3 can be electrically energized via this radial bearing 5. An electrical current generated by providing a microcurrent generator utilizing solar panels or magnet rings can flow along a path containing the support shaft 2a, radial bearing 5, and roller 3, and can flow to the skin in contact with this roller 3. "Microcurrent" is a method for stimulating cells by allowing an extremely weak current ($\mu A$) to flow, and it is a beautification technique for improving the flow of lymph fluid, accelerating blood circulation, and increasing metabolism by activating sleeping cells. Because the microcurrent is a weak current allowed to flow artificially to the skin, effects on skin care and forming attractive skin can be anticipated. In addition, reviving the skin cells and regaining the firmness of the face by continuous use can be anticipated.

Furthermore, by plating the surface of the roller 3 with platina or another metal, the microcurrent generator functions effectively. In addition, so plating the surface of the roller 3 gives a luxurious feeling in terms of appearance.

It is preferable to provide a gap 10, which will serve as a fitting surface, formed in the axial direction on at least one surface selected from the inner peripheral surface of the roller 3 and the outer peripheral surface of the radial bearing 5. By providing this gap 10, even when water permeates as far as the interior of the roller 3 surrounded by the bearing device 4, water (including steam) can drain through this gap 10 and the water can be prevented from stagnating inside the bearing device 4.

Because the beauty/health roller of the present invention uses a bearing device composed of a lightweight slider bearing made of a resin and having a simple shape, or other bearing, the weight can be reduced to a substantially greater extent than when conventional ball bearings are used. In addition, the rotational resistance of the roller can be reduced, resulting in an exceptional feel for use of the bearing device. A waterproof structure required when stainless steel ball bearings are used is obviated, greater reductions in weight are achieved, and further reductions in cost are realized. Furthermore, because no grease or the like is used and no concerns are presented in regard to bathwater contamination so as to yield a hygienic configuration, the invention can also be ideally used during bathing.

INDUSTRIAL APPLICABILITY

Because the bearing device for a beauty/health roller of the present invention is lighter than conventional ball bearings, no roller rattle occurs, the rotational resistance of the rollers is reduced, there is no concern of bathwater or bathtub contamination even during bathing, and a hygienic configuration is realized; therefore, the invention can be ideally used as a bearing device for supporting rollers in beauty/health rollers primarily used by women.

EXPLANATION OF REFERENCE NUMERALS AND SYMBOLS

1 beauty/health roller
2 body
2a support shaft
2b end portion
3 roller
3a opening portion
4 bearing device
5 radial bearing
5a shaft hole
5b sleeve portion
5c fitting groove
5d end face
5e outer peripheral end face
6 thrust bearing
7 preload-applying member
7a cylinder portion
7b outwardly flared portion
7c boundary portion
8 separate members
8a leg portion
8b projecting portion
9 cap
9a end portion
10 gap

The invention claimed is:

1. A bearing device for a manual beauty and health roller having a grippable main unit and a roller arranged at an end portion of the grippable main unit, the bearing device rotatably supporting the roller on a support shaft on said end portion of the grippable main unit,
    the bearing device characterized in comprising: a radial bearing into which the support shaft is fitted, the radial bearing rotatably supporting the roller on the support shaft; a thrust bearing arranged toward one end face of the radial bearing, a preload-applying member interposed between the radial bearing and the thrust bearing, said radial bearing being adapted to rotate synchronously with said roller when said roller is pressed against bare skin and said roller is caused to rotate,
    wherein the preload-applying member is in contact with the thrust bearing and each of the radial bearing and the thrust bearing is a slider bearing obtained by being molded from a resin composition and
    wherein the entire preload-applying member is a single piece elastic ring that is elastically deformed and said elastically deformed ring is interposed between the radial bearing and the thrust bearing,
    characterized in that the elastic ring comprises a cylindrical portion fitted to a sleeve portion of the radial bearing, and a flared portion in contact with the thrust bearing.

2. The bearing device for a beauty and health roller of claim 1, characterized in that the radial bearing is electroconductive.

3. The bearing device for a beauty and health roller of claim 1, characterized in that the elastic ring comprising a rubber or an elastomer.

4. The bearing device for a beauty and health roller of claim 3; characterized in that the rubber or elastomer is at least one material selected from among silicone rubber, ethylene-propylene rubber, acrylonitrile-butadiene rubber, and fluororubber.

5. The bearing device for a beauty and health roller of claim 3, characterized in that the elastic ring is configured so as to be capable of elastically deforming into an outwardly flared shape.

6. The bearing device for a beauty and health roller of claim 1, characterized in that a boundary portion between the cylindrical portion and the flared portion is thinner than the cylindrical portion.

7. The bearing device for a beauty and health roller of claim 1, characterized in that the resin composition used in the molding of at least one of the radial bearing and the thrust bearing is a composition that includes a lubricity improver.

8. The bearing device for a beauty and health roller of claim 7, characterized in that the lubricity improver is at least one material selected from among carbon, solid lubricants, waxes, and lubricating oils.

9. The bearing device for a beauty and health roller of claim 1, characterized in that the radial bearing is an article obtained by injection-molding the resin composition for molding the radial bearing.

10. The bearing device for a beauty and health roller of claim 1, characterized in that the base resin of the resin composition is at least one synthetic resin selected from among polyacetal resin, polyphenylene sulfide resin, polyamide resin, polyphenylene oxide resin, and polyethylene resin.

11. The bearing device for a beauty and health roller of claim 1, characterized in that a gap formed in an axial direction is provided on at least one surface selected from among an inner peripheral surface of the roller and an outer peripheral surface of the radial bearing.

12. A beauty and health roller having a grippable main unit, a roller arranged at an end portion of the main unit, and a bearing device for rotatably supporting the roller on a support shaft provided at the end portion of the main unit, the beauty/health roller characterized in that the bearing device is the bearing device of claim 1.

13. The beauty and health roller of claim 12, characterized in that a surface of the roller is metal plated, and the support shaft and the roller are electrically energized via the bearing device.

14. The beauty and health roller of claim 12, characterized in that a plurality of the bearing devices are provided in the interior of the roller in the axial direction.

15. The beauty and health roller of claim 12, characterized in that the interior of the roller does not have a waterproof structure.

16. A bearing device for a manual beauty and health roller having a grippable main unit and a roller arranged at an end portion of the grippable main unit the bearing device rotatably supporting the roller on a support shaft on said end portion of the grippable main unit,
the bearing device characterized in comprising: a radial bearing into which the support shaft is fitted, the radial bearing rotatably supporting the roller on the support shaft: a thrust bearing arranged toward one end face of the radial bearing, a preload-applying member interposed between the radial bearing and the thrust bearing,
wherein the preload-applying member is in contact with the thrust bearing and each of the radial bearing and the thrust bearing is a slider bearing obtained by being molded from a resin composition,
wherein the radial bearing slides on the support shaft of the grippable main unit and rotates in synchronization with the roller, and
wherein the entire preload-applying member is a single piece elastic ring that is elastically deformed and said elastically deformed ring is interposed between the radial bearing and the thrust bearing,
characterized in that the elastic ring comprises a cylindrical portion fitted to a sleeve portion of the radial bearing, and a flared portion in contact with the thrust bearing.

17. The bearing device for a beauty and health roller of claim 16, characterized in that an axially oriented, rib-shaped projection is formed on an inner peripheral surface of the roller; a fitting groove into which the rib-shaped projection is fitted is formed on the outer peripheral surface of the radial bearing; and the radial bearing rotates in synchronization with the roller by the fitting of the rib-shaped projection and the fitting groove.

18. The bearing device for a beauty and health roller of claim 16, characterized in that a member separate from the roller is provided on an outer peripheral surface of the roller; a leg portion of the separate member projects from an inner peripheral surface of the roller through a hole portion formed in the surface of the roller; a fitting groove into which the projecting portion of the leg portion of the separate member is fitted is formed in the outer peripheral surface of the radial bearing; and the radial bearing rotates in synchronization with the roller by the fitting of the projection portion and the fitting groove.

* * * * *